United States Patent [19]

Uchikawa et al.

[11] Patent Number: 4,652,427
[45] Date of Patent: Mar. 24, 1987

[54] FUEL ASSEMBLY

[75] Inventors: Sadao Uchikawa, Katsuta; Motoo Aoyama, Hitachi, both of Japan

[73] Assignee: Hitachi, Ltd., Tokyo, Japan

[21] Appl. No.: 597,031

[22] Filed: Apr. 5, 1984

[30] Foreign Application Priority Data

Apr. 6, 1983 [JP] Japan .................. 58-59284

[51] Int. Cl.[4] .................................. G21C 3/32
[52] U.S. Cl. ...................... 376/447; 376/419; 376/423; 376/434; 376/438; 376/906
[58] Field of Search ............... 376/447, 419, 423, 434, 376/438, 904, 906

[56] References Cited

U.S. PATENT DOCUMENTS

| 3,342,692 | 9/1967 | Bourrasse | 376/417 |
| 4,071,587 | 1/1978 | Eggers | 376/417 |
| 4,127,443 | 11/1978 | Wetch | 376/346 |
| 4,186,050 | 1/1980 | West | 376/419 |
| 4,355,002 | 10/1982 | Hosokawa | 376/447 |

FOREIGN PATENT DOCUMENTS 53-41696  4/1978  Japan .

Primary Examiner—Donald P. Walsh
Attorney, Agent, or Firm—Antonelli, Terry & Wands

[57]     ABSTRACT

The invention provides a fuel assembly comprising a plurality of fuel rods containing a fissionable material and a plurality of moderator rods filled with a burnable poison and a metal hydride as a solid moderator material. All of the burnable poison in the fuel assembly is filled in the moderator rods, and number of the moderator rods is at least 4 and not more than 15% of total number of the fuel rods and the moderator rods.

14 Claims, 7 Drawing Figures

FUEL ASSEMBLY

BACKGROUND OF THE INVENTION

This invention relates to a fuel assembly and particularly to a fuel assembly suitable for use in boiling water-type nuclear reactors.

In operation of a nuclear reactor for a definite period, it is necessary to run the initial phase of operational period with an excess reactivity corresponding to the deterioration of reactivity due to burning of fissionable material during the operation. To keep the nuclear reactor in a critical state, it is necessary to control the excess reactivity, and the following methods have been so far used often in combination: a method for inserting control rods of neutron-absorbing material into a core, and a method for charging into a core a fuel assembly containing fuel rods whose fuels are incorporated with burnable poisons of large neutron absorption cross-section such as $Gd_2O_3$, etc.

Recently, a fuel directed to an increased burnup, that is, a long life fuel, has been under development. To improve a fuel economy in the long life fuel, it is necessary to enhance the enrichment, but an increase in enrichment leads to the following problems. A first problem is an increase in excess reactivity, which must be controlled in the initial phase of burning, due to the increase in enrichment, and in the case of the conventional fuel assembly using gadolinia ($Gd_2O_3$)-containing fuel rods, the number of gadolinia-containing fuel rods must be increased. Furthermore, the average energy level of neutron are enhanced, and consequently the excess reactivity control effect per gadolinia-containing fuel rod is reduced. Thus, the number of gadolinia-containing fuel rods in a fuel assembly must be further increased. A second problem due to the increase in enrichment is an increase in the absolute value of void reactivity coefficient, caused by the enhancement of neutron energy level, and the control rod reactivity worth is lowered.

To solve these problems, such a fuel assembly has been proposed (Japanese Patent Application Kokai (Laid-open) No. 53-41696, FIG. 3), where rods are arranged in 8 rows and 8 lines (8×8) in a fuel assembly, and consist of first fuel rods filled with fuel pellets of nuclear fuel material, second fuel rods whose fuel pellets are incorporated with gadolinia, and burnable poison containing moderator rods filled with a moderator material (for example, $B^{11}$, beryllium carbon and their compounds, light water and heavy water) and a burnable poison (for example, $B^{10}$, Gd and their compounds), as arranged in a channel box. The second fuel rods are arranged one each at four corners of the channel box, totalling to 4. Four burnable poison-containing moderator rods are arranged adjacently to one another at the center of the channel box. The fuel assembly thus has three kinds of rods filled with different materials at the inside, and consequently a process for producing a fuel assembly becomes complicated.

SUMMARY OF THE INVENTION

An object of the present invention is to provide a fuel assembly capable of simplifying a process for producing the same.

Another object of the present invention is to provide a fuel assembly capable of improving a fuel economy.

The present invention is characterized by providing a plurality of moderator rods filled with a burnable poison and a solid moderator material, the solid moderator material being a material having a larger neutron-moderating capacity than that of a coolant for a nuclear reactor in which a fuel assembly is to be charged, and all of the burnable poison in the fuel assembly being filled in the moderator rods.

DESCRIPTION OF THE PREFERRED EMBODIMENTS

The present invention has been established on the basis of the results of the following studies.

Generally, the neutron absorption cross-section of burnable poison such as gadolinia, etc. for use in light water-moderated nuclear reactors increases with lowering neutron energy level. Thus, by providing a burnable poison in an atmosphere of low neutron energy level, that is, an atmosphere with a soft neutron spectrum, the excess reactivity control effect by the burnable poison can be enhanced. The absolute value of void reactivity coefficient is also reduced with lowering neutron energy level of a fuel assembly. In the present invention, the excess reactivity control effect by a burnable poison can be enhanced by replacing some of fuel rods in a fuel assembly with moderator rods made of a solid moderator material having a larger neutron moderating capacity than that of water as a coolant, that is, a metal hydride (for example, $ZrH_2$, $CeH_2$, etc.), thereby lowering the average neutron energy level in the fuel assembly, and furthermore by incorporating the burnable poison into the moderator rods having a softer neutron spectrum than that of fuel rods. Consequently, the desired excess reactivity control can be obtained with a smaller number of burnable poison-containing moderator rods than the number of the conventional gadolinia-containing fuel rods.

The number of burnable poison-containing moderator rods in the fuel assembly according to the present invention is determined as follows.

Figure 1:
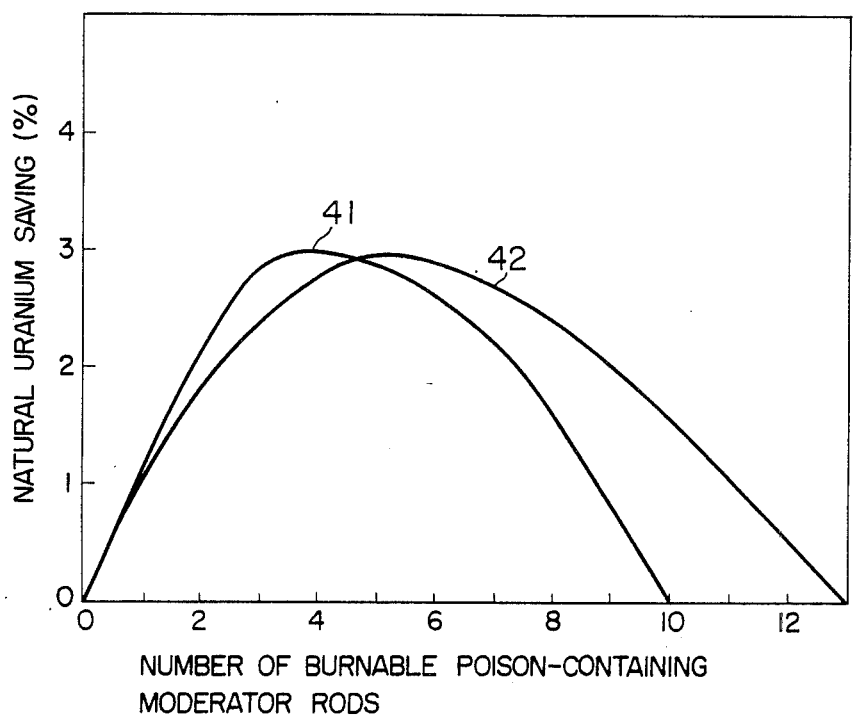
FIG. 1 is a diagram showing a relationship between burnable poison-containing moderator rods and natural uranium saving effect.

Burnable poison-containing moderator rods, after the burnable poison has burnt up, works as a neutron moderator in the same manner as the water rods provided in the conventional fuel assembly. When some of fuel rods are replaced with burnable poison-containing rods in a fuel assembly, a moderator-to-fuel ratio is increased. The increase in the moderator-to-fuel ratio leads to an increase in neutron infinite multiplication factor, so long as the enrichment of fuel is equal. Thus, the necessary amount of natural uranium for maintaining a definite amount of discharge burnup can be saved in the fuel assembly, as shown in FIG. 1, where a natural uranium saving effect is shown for obtaining a unit burnup when some of fuel rods are replaced with burnable poison-containing moderator rods, presuming the moderator material to be a material having the hydrogen density as high as that of water. Curve 41 is an analytical example of a fuel assembly in the 8×8 arrangement and curve 42 is that of a fuel assembly in the 9×9 arrangement. When $ZrH_2$ is used as a moderator material, curves 41 and 42 can have a natural uranium saving peak value of about 3.5% in the same region for the number of moderator rods as in FIG. 1. With increasing number of moderator rods, the uranium saving effect is increased. In the fuel assembly in the 8×8 arrangement, the peak value can be obtained with 4 moderator rods, whereas in the fuel assembly in the 9×9 arrangement, the peak value with 5 moderator rods. With further increase in the number of moderator rods, the uranium saving effect is decreased, and the fuel economy is deteriorated with 10 or more moderator rods in the 8×8 arrangement or with 13 or more moderator rods in the 9×9 arrangement. Thus, the number of moderator rods insertable without any deterioration of fuel economy is within about 15% of the total number of all the rods in a fuel assembly. On the other hand, the necessary number of burnable poison-containing moderator rods depends upon the excess reactivity control amount, and the required excess reactivity control amount for the standard fuel enrichment of 2.8% in the current boiling water type nuclear reactor is about 20% $\Delta_{K/K}$ or more, and also the excess reactivity control amount per burnable poison-containing moderator rod is about 5%, as will be described later. Thus, at least 4 burnable poison-containing moderator rods must be charged in a fuel assembly in the 8×8 arrangement. This number 4 of moderator rods corresponds to 6% of total rod number, and thus the total number of burnable poison-containing moderator rods must be at least 4, and the maximum total number is desirably not more than 15% of total number of all the rods, that is, fuel rods and moderator rods.

The amount of burnable poison to be incorporated into one moderater rod will be described below. When the burnable poison remains at the last phase of operational period, the reactivity is lowered by neutron absorption, and thus the fuel enrichment must be increased to bring the nuclear reactor into a critical state, whereby the fuel economy is deteriorated.

Figure 2:
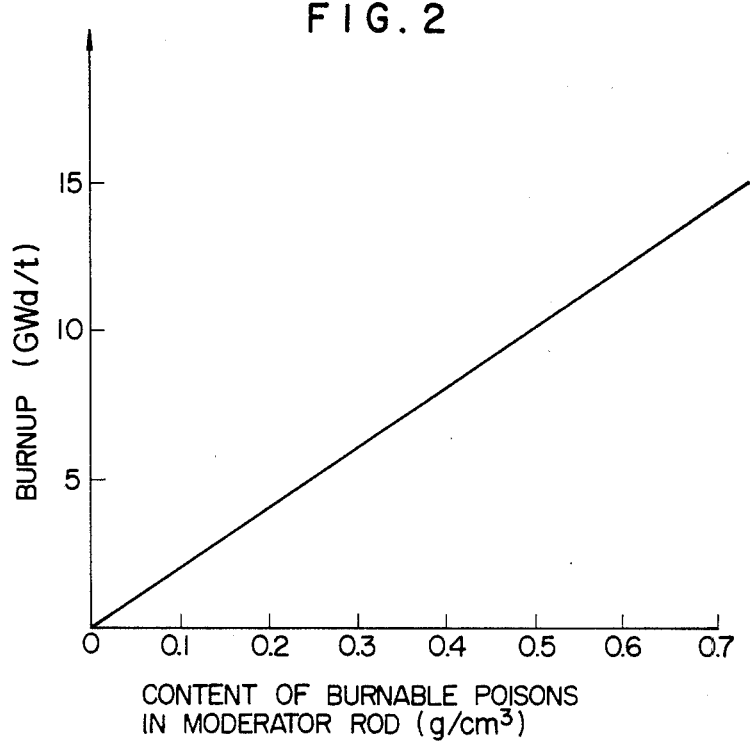
FIG. 2 is a diagram showing a relationship between the content of burnable poison in a moderator rod and burnup of fuel until the burnable poison is burnt up.

In FIG. 2, a relationship is between the amount of burnable poison gadolinia present in moderator rod at the initial phase of burning and burnup of fuel until the burnable poison is burnt up. A period of continued operation of a boiling water-type nuclear reactor is usually 9 to 15 months, which corresponds to 7 GWd/t to 12 GWd/t for a power density of 50 kw/l in terms of fuel burnup. Thus, the amount of gadolinia to be incorporated into one moderator rod so that no gadolinia can remain in it at the last phase of operation is 0.35 to 0.6 g/cm³, which corresponds to average values throughout the core. When the power distribution in the nuclear reactor is taken into account, the fuel burnup at the last phase of operation with a low power is about 40% on the average throughout the core. In order not to leave unburnt gadolinia at the last phase of operation even in the low power core region, the amount of gadolinia to be incorporated into one moderator rod is preferably in a range of 0.15 to 0.6 g/cm³. With a lower amount of gadolinia than 0.15 g/cm³ the gadolinia is soon consumed right after the start of oepration, and the excess reactivity control effect will be lost.

To increase the effect of the present invention, the neutron moderator material for the burnable poison-containing moderator rod must have a larger neutron-moderating capacity. A material having the largest neutron-moderating capacity is hydrogen. Thus, a material having a larger hydrogen content is desirable. Light water at about 280° C. passes through the conventional water rod, which thus has a hydrogen density of $5 \times 10^{22}/cm^3$. A moderator material having a hydrogen density above $5 \times 10^{22}/cm^3$ is desirable. The reason for a larger hydrogen density than that in light water is that there is a water gap region outside the fuel assembly, and thus the energy level of thermal neutron group in a fuel assembly is higher at the center region (on a horizontal cross-section) of the fuel assembly and lower at the peripheral region. To rectify the energy distribution of said thermal neutron group by a moderator rod having a smaller cross-section than the cross-section of the water gap region, thereby lowering the neutron energy level throughout the fuel assembly, a material having a larger neutron-moderating capacity than that of light water must be used for the moderator rod.

The moderator material satisfying this requirement includes metal hydrides such as zirconium hydride ($ZrH_2$), cerium hydride ($CeH_2$), etc. These metal hydrides are solid moderator materials. The hydrogen density in $ZrH_2$ is $7.2 \times 10^{22}/cm^3$ and that in $CeH_2$ is $7.0 \times 10^{22}/cm^3$.

In the present fuel assembly, the excess reactivity can be controlled with a smaller number of burnable poison-containing rods (said second fuel rods and burnable poison-containing moderator rods) than that in the fuel assembly disclosed in Japanese Patent application Kokai (Laid-open) No. 53-41696, as described above. Accordingly, the second fuel rods (fuel rods whose fuel pellets are incorporated with a burnable poison) are unnecessary and consequently the process for producing a fuel assembly can be considerably simplified.

In the said prior art fuel assembly, local peaking is large due to the presence of the second fuel rods, and correspondingly the enrichment distribution (on a horizontal cross-section of fuel assembly) of other first fuel rods (filled with fuel pellets containing no burnable poison) arranged in the fuel assembly is adjusted to flatten the power (on a horizontal cross-section) of the fuel assembly. Thus, the prior art fuel assembly requires many first fuel rods with different enrichments. In the present invention, on the other hand, no second fuel rods are provided, so that the local peaking can be lowered, that is, there is no necessity for controlling the local peaking in contrast to the prior art fuel assembly. Thus, the kinds of the first fuel rods having different enrichments are less than those of the prior art fuel assembly, which also leads to the simplification of the process for producing a fuel assembly.

The said metal hydrides have a small change in density in a temperature range from room temperature to a high temperature in the nuclear reactor-operating condition, and thus a difference in reactivity between a low temperature and a high temperature can be made smaller by using the metal hydrides in a burnable poison-containing moderator rod. This leads to reduction in the necessary control rod reactivity for nuclear reactor shutdown and also to reduction in the number of control rods.

A preferred embodiment of the present fuel assembly based on the result of the foregoing studies will be described below.

Figure 3:
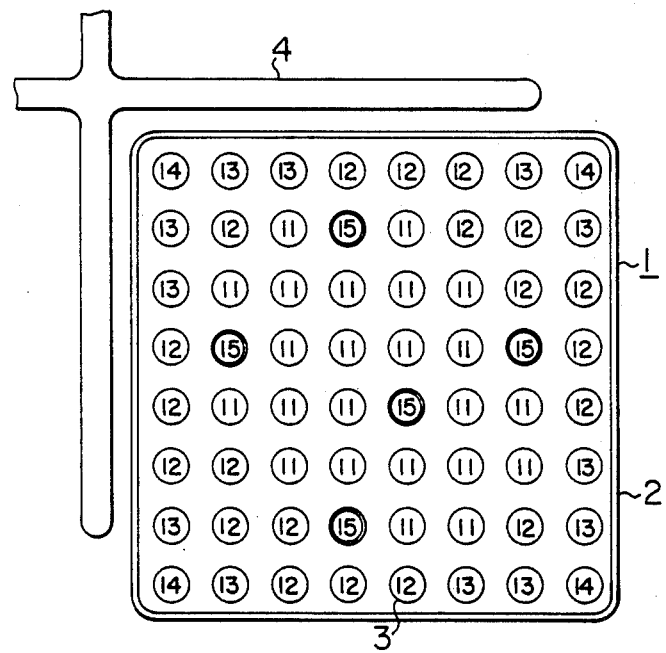
FIG. 3 is a horizontal cross-sectional view of a fuel assembly according to one preferred embodiment of the present invention.

In FIG. 3, a horizontal cross-sectional view of the present fuel assembly is shown, where a fuel assembly 1 comprises 59 fuel rods 3 and 5 burnable poison-containing moderator rods 15, arranged in a channel box 2. The upper and lower ends of the fuel rods 3 and the burnable poison-containing moderator rods 15 are supported by an upper tie plate and a lower tie plate, though not shown in the drawing. The channel box 2 is fixed to the upper tie plate.

Fuel rods 3 each comprise claddings with both sealed ends, in which a large number of fuel pellets of $UO_2$ are filled. These fuel pellets, that is, fuel rods 3, contain no burnable poison. As fuel rods 3, 4 kinds of fuel rods designated with numerals 11, 12, 13 and 14 are provided. Uranium enrichment for fuel rods 11 is 3.1% by weight, that for fuel rods 12 2.8% by weight, that for fuel rods 13 2.4% by weight, and that for fuel rods 14 1.8% by weight. Fuel rods 11, 12, 13 and 14 are arranged in the channel box 2, as shown in FIG. 3. 59 fuel rods 3 having such different enrichments have an average enrichment of 2.77% by weight. Control rod 4 is at one corner of the fuel assembly 1, and the burnable poison-containing moderator rods 15 each comprise cladding with the same dimension as that of fuel rods 3, in which zirconium hydride pellets containing 0.37 g/cm$^3$ of gadolinia are filled in place of the fuel pellets. The burnable poison-containing moderator rods 15 are arranged at symmetrical positions to the diagonal line connecting the corner of fuel assembly 1 facing the control rod 4 to the corner of fuel assembly 1 at the diagonal position thereto so as to maintain such a characteristic that the power distribution through the fuel assembly 1, that is, neutron flux distribution, is symmetrical to the diagonal line, irrespective of insertion or withdrawal of the control rod and reduce the uneven fuel burnup caused by the asymmetry. Furthermore, the burnable poison-containing moderator rods 15 are arranged so that they may not be adjacent to one another, because, if a plurality of burnable poison-containing moderator rods approach one another, as disclosed in Japanese Patent Application Kokai (Laid-open) No. 53-41696, the thermal neutron energy level around the moderator rods is enhanced due to the neutron absorption by the burnable poison, and such enhancement should be desirably avoided.

If the thermal neutron energy level is enhanced, as mentioned above, the excess reactivity control effect by the burnable poison-containing moderator rods 15 is lowered, which contradicts the objects of the present invention.

The effects of this embodiment will be described below in comparison with the prior art fuel assembly. The prior art fuel assembly is a fuel assembly in the 8×8 arrangement comprising 2 water rods, 6 gadolinia-containing fuel rods (second fuel rods), the balance being first fuel rods, with an average fuel rod enrichment being 2.77% by weight, and a gadolinia content in the gadolinia-containing fuel rods being 0.30 g/cm$^3$, the total amount of gadolinia throughout the fuel assembly being equal to that of the present embodiment of the invention.

Figure 4:
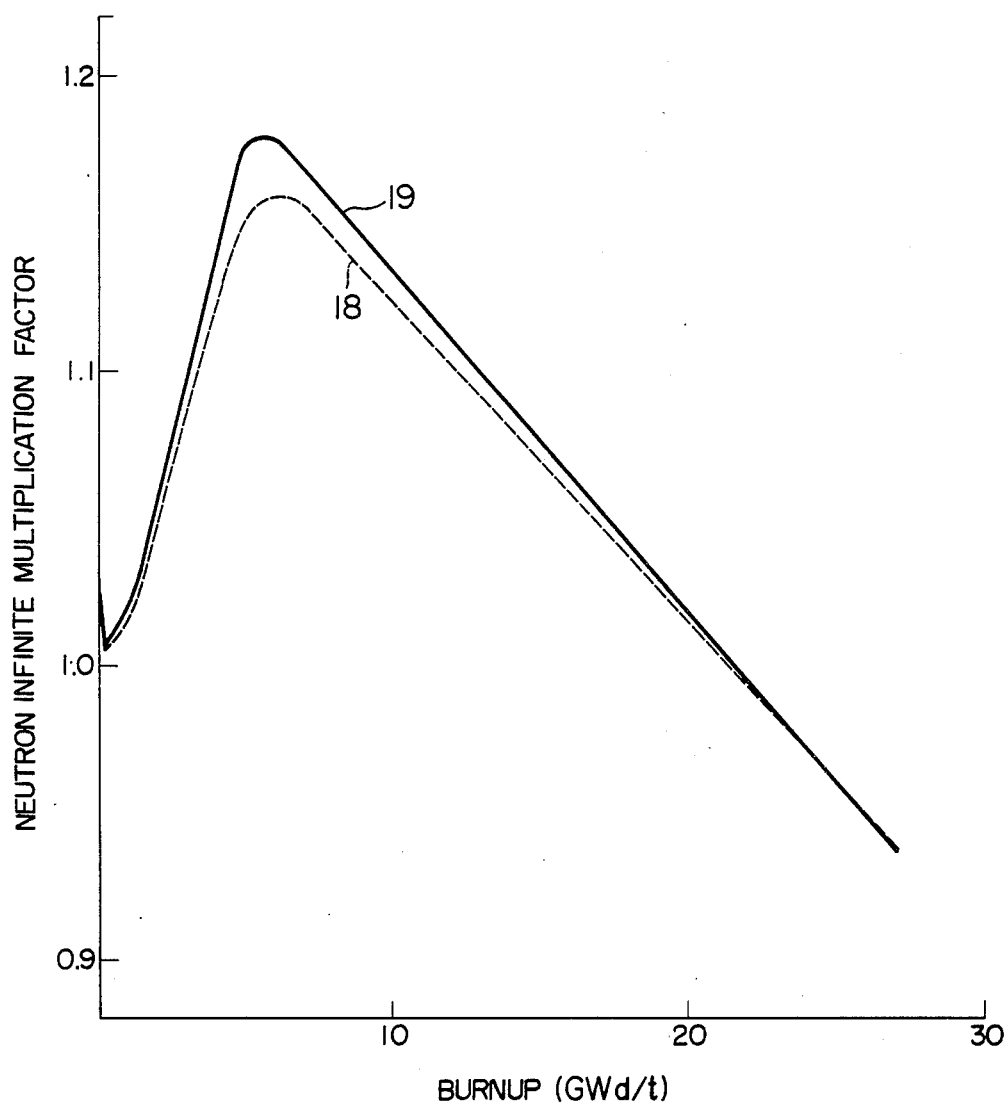
FIG. 4 is a diagram showing changes in neutron infinite multiplication factor with burnup.

In FIG. 4, changes in neutron infinite multiplication factor with burning of these two fuel assemblies are shown, where curve 18 corresponds to the prior art and curve 19 to the present embodiment of the invention. Neutron infinite multiplication factors are almost equal on these two curves at the initial phase of burning. That is, this means that the excess reactivity control amounts by gadolinia are equal in these two fuel assemblies. The reactivity control amount per gadolinia-containing fuel rod of the prior art is 3.8% $\Delta_{K/K}$, whereas that per burnable poison-containing moderator rod of the present embodiment of the invention is 4.9% $\Delta_{K/K}$ which is an 28% increase. That is, the excess reactivity can be controlled with a smaller number of burnable poison-containing moderator rods than that of the prior art gadolinia-containing fuel rods.

Effect of using zirconium hydride having a larger hydrogen density than that of light water as a moderator material for the burnable poison-containing moderator rods in the present embodiment of the invention will be described below. When the moderator material for the burnable poison-containing moderator rods is assumed to be light water in the present embodiment of the invention, the excess reactivity control amount will be 4.5% $\Delta_{K/K}$ per moderator rod, which is by about 8% smaller than that of zirconium hydride. Thus, the present embodiment of the invention is much distinguished in the excess reactivity control.

Fuel economy will be described below. In FIG. 4, the neutron infinite multiplication factor of the present embodiment of the invention is higher than that of the prior art when the burning proceeds, because each of the burnable poison-containing moderator rods of the present embodiment of the invention, after $^{155}$Gd and $^{157}$Gd in the gadolinia have been consumed, has a higher neutron-moderating effect than that of the conventional water rod (because of zirconium hydride used as the moderator material) and has a higher neutron-moderating function than that of five water rods. Thus, the fuel economy of the present embodiment of the invention is 3% improved over that of the comparative prior art having the equal average enrichment.

The foregoing prior art corresponds to the fuel assembly disclosed in Japanese Patent application Kokai (Laid-open) No. 53-41696, FIG. 1, and the reactivity of the prior art fuel assembly changes with increasing burnup, as shown by characteristic curve B in FIG. 4 of said publication. A prior art fuel assembly in FIG. 3 of said publication comprises the first fuel rods, the second fuel rods and burnable poison-containing moderator rods, as described before, and its reactivity changes along characteristic curve C in FIG. 4 of said publication. According to the said publication, a fissionable material can be charged into the fuel assembly of FIG. 3 of said publication in an amount corresponding to the difference between the peak of characteristic curve B and that of characteristic curve C (points at which the burnable poison is fully consumed in the fuel assemblies) to enhance the burnup. In the present embodiment of the invention, on the other hand, the reactivity can be increased over the peak value of characteristic curve B in FIG. 4 of said publication without changing the charged amount of fissionable material in the fuel assembly when the burnable poison is fully consumed, whereby the burnup can be increased, that is, the fuel economy can be increased. This is because $ZrH_2$ having a larger neutron-moderating capacity than that of light water as a coolant is used as a moderator material for the burnable poison-containing moderator rods in the present embodiment of the invention. That is, the neutron energy level of the burnable poison-containing moderator rods is considerably lowered in the present embodiment of the invention, and thus a higher excess reactivity control effect can be obtained with a small amount of burnable poison. At the same time, a high neutron-moderating effect by $ZrH_2$ can be obtained in the present embodiment of the invention when the burnable poison is fully consumed.

Since the amount of burnable poison in a fuel assembly can be reduced, the second fuel rods arranged in the fuel assembly in FIG. 3 of said publication are unnecessary, and consequently a complicated process for producing the second fuel rods is unnecessary, so that a process for producing the fuel assembly according to the present embodiment of the invention can be considerably simplified. Since the second fuel rods are unnecessary, it is not necessary to control local peaking, as described before. This leads to reduction in kinds of enrichment for fuel rods 3, and ultimately the production of a fuel assembly can be more simplified.

Another embodiment of the present invention will be described below. The excess reactivity control effect by the burnable poison increases in an atmosphere with a low neutron energy level, as already described before. Thus, a higher excess reactivity control effect can be obtained generally by arranging the burnable poison-containing moderator rods at the peripheral part of a fuel assembly near the water gap. However, when the burnable poison-containing moderator rods are arranged in an atmosphere with a low neutron energy level on the contrary, neutrons are absorbed by the moderator material in the moderator rods, though weakly, after the burnable poison has been fully consumed. The neutron absorption by the moderator material deteriorates the fuel economy. The effect of neutron absorption by the moderator material depends upon two factors, that is, (i) position of burnable poison-containing moderator rods, and (ii) a product of macroscopic absorption cross-section ($\Sigma a$) of moderator material contained in the burnable poison-containing moderator rods and cross-section of the burnable poison-containing moderator rods.

Figure 5:
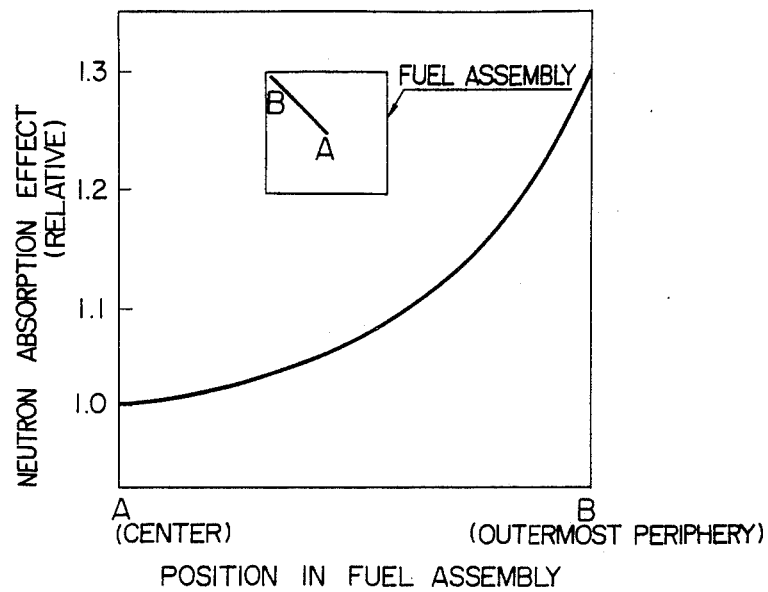
FIG. 5 is a characteristic diagram showing the neutron absorption effect at the cross section of fuel assembly.
Figure 6:
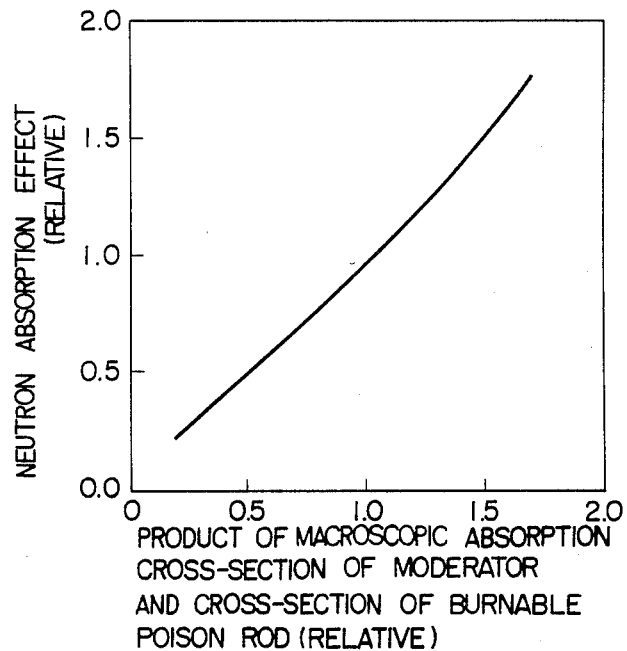
FIG. 6 is a characteristic diagram showing a relationship between a product of macroscopic absorption cross-section of moderator and cross-section of burnable poison-containing moderator rod and the neutron absorption effect.

In FIGS. 5 and 6 are shown a position for inserting the burnable poison-containing moderator rods and a relationship between the product of $\Sigma a$ and the cross-section of burnable poison-containing moderator rods, and the effect of neutron absorption, respectively, from which it is obvious that the effect of neutron absorption by moderator material can be reduced by inserting the burnable poison-containing moderator rods at the center of a fuel assembly or by reducing the product of $\Sigma a$ and the cross-section of burnable poison-containing moderator rods (that is, reducing the moderating capacity). This means that an increase in the excess reactivity control effect and a decrease in the effect of neutron absorption by moderator material contradict each other. However, the decrease in the effect of neutron absorption by reducing the product of $\Sigma a$ and the cross-section of burnable poison-containing moderator rods is larger than the decrease in the excess reactivity control effect by lowering the moderating capacity, and thus the fuel economy, more particularly, neutron economy, can be considerably improved without a large reduction in the excess reactivity control effect by making smaller the product of $\Sigma a$ of the moderator material contained in the burnable poison-containing moderator rods and the cross-section of the burnable poison-containing moderator rods inserted at the fuel assembly peripheral part having a higher neutron absorption effect than that at the fuel assembly center part. That is, the product of $\Sigma a$ and the cross-section of the moderator rods must be reduced with increasing distance from the center of the fuel assembly. The reduction of product of the macroscopic absorption cross-section of moderator material contained in the burnable poison-containing moderator rods and the cross-section of burnable poison-containing moderator rods can be attained by (i) reduction in the moderator material density and (ii) use of a moderator material having a smaller absorption cross-sectional area, for example, deuterium, carbon, etc.

Figure 7:
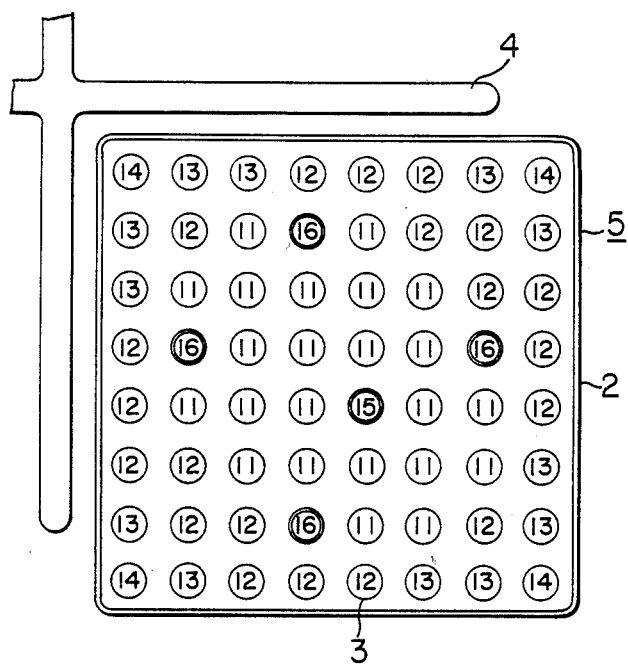
FIG. 7 is a horizontal cross-sectional view of a fuel assembly according to another embodiment of the present invention.

According to another embodiment shown in FIG. 7, a fuel assembly 5 has one burnable poison-containing moderator rod 15 and 4 burnable poison-containing moderator rods 16, where the density of zirconium hydride in the four burnable poison-containing moderator rods 16 is lower than that in the one burnable poison-containing moderator rod 15 to reduce the hydrogen density from $7.2 \times 10^{22}$ cm$^{-3}$ to $2.5 \times 10^{22}$ cm$^{-3}$. According to this embodiment, the excess reactivity control amount per burnable poison-containing moderator rod is 4.76% $\Delta_{K/K}$, which is small than 4.9% $\Delta_{K/K}$ of the fuel assembly 1, but the neutron absorption amount by hydrogen is 40% (the reactivity: about 0.3% $\Delta_{K/K}$), and the fuel economy can be improved.

What is claimed is:

1. A fuel assembly comprising a plurality of fuel rods arranged in a lattice pattern, and a plurality of moderator rods filled with a burnable poison and a solid moderator material, the solid moderator material being a material having a larger neutron-moderating capacity than that of a coolant in a nuclear reactor in which the fuel assembly is charged, and all of the burnable poison in the fuel assembly being filled only in the moderator rods.

2. A fuel assembly according to claim 1, wherein the moderator material is a metal hydride.

3. A fuel assembly according to claim 1 or 2, wherein the burnable poison is incorporated in the moderator rods in a range of from 0.15 g/cm$^3$ to 0.60 g/cm$^3$ per moderator rod.

4. A fuel assembly according to claim 1 or 2, wherein number of the moderator rods is at least 4, and not more than 15% of total number of the fuel rods and the moderator rods.

5. A fuel assembly according to claim 3, wherein number of the moderator rods is at least four and not ore than 15% of total number of the fuel rods and the moderator rods.

6. A fuel assembly according to claim 1, wherein a product of macrocopic neutron absorption cross-section of the moderator materials filled in the moderator rods and cross-section of the moderator rods is reduced with increasing distance from the center of the fuel assembly.

7. A fuel assembly according to claim 6, wherein the moderator material is a metal hydride.

8. A fuel assembly according to claim 6 or 7, wherein the burnable poison is incorporated in the moderator rods in a range of from 0.15 g/cm$^3$ to 0.60 g/cm$^3$ per moderator rod.

9. A fuel assembly according to claim 6 or 7, wherein number of the moderator rods is at least 4, and not more than 15% of total number of the fuel rods and the moderator rods.

10. A fuel assembly according to claim 8, wherein number of the moderator rods is at least four, and not more than 15% of total number of the fuel rods and the moderator rods.

11. A fuel assembly according to claim 1, wherein the plurality of moderator rods are arranged in the fuel assembly so as to be non-adjacent each other.

12. A fuel assembly according to claim 1, wherein the plurality of fuel rods of the fuel assembly contain a fissionable nuclear fuel material without any burnable poison.

13. A fuel assembly according to claim 1, wherein the plurality of fuel rods of the fuel assembly contain a fissionable nuclear fuel material without any moderator material.

14. A fuel assembly according to claim 1, wherein the plurality of fuel rods of the fuel assembly contain a fissionable nuclear material without any burnable poison and any moderator material.

* * * * *